United States Patent

Hsu

[11] Patent Number: 5,886,445
[45] Date of Patent: Mar. 23, 1999

[54] EXTENDED CAGE ADJUSTABLE SPEED ELECTRIC MOTORS AND DRIVE PACKAGES

[75] Inventor: John S. Hsu, Oak Ridge, Tenn.

[73] Assignee: Lockheed Martin Energy Research Corporation, Oak Ridge, Tenn.

[21] Appl. No.: 887,019

[22] Filed: Jul. 2, 1997

[51] Int. Cl.$^6$ .......................... H02K 17/16; H02K 16/00; H02K 1/12

[52] U.S. Cl. ........................... 310/211; 310/114; 310/256

[58] Field of Search ...................... 310/112, 113, 310/114, 166, 168, 211, 212, 164, 256

[56] References Cited

U.S. PATENT DOCUMENTS

| | | | |
|---|---|---|---|
| 3,017,553 | 1/1962 | Homan | 310/112 |
| 3,069,577 | 12/1962 | Lee | 310/166 |
| 3,144,597 | 8/1964 | Lee | 310/166 |
| 3,226,582 | 12/1965 | Beckwith | 310/59 |
| 4,141,210 | 2/1979 | Flaig | 310/164 |
| 4,563,606 | 1/1986 | Fukasawa et al. | 310/164 |
| 4,785,213 | 11/1988 | Satake | 310/114 |
| 4,945,296 | 7/1990 | Satake | 310/112 |
| 5,051,639 | 9/1991 | Satake et al. | 310/112 |
| 5,068,559 | 11/1991 | Satake et al. | 310/112 |

OTHER PUBLICATIONS

Louis J. Hunt "A New Type of Induction Motor," paper read Mar. 19, 1907, Manchester Local Section, *Journal IEE*, pp. 648–677, 1907.

Y. Liao, "Design of a Brushless Doubly–Fed Induction Motor for Adjustable Speed Drive Applications", IEEE IAS Annual Meeting, San Diego, California, 1986, pp. 850–855.

*Primary Examiner*—Clayton LaBalle
*Attorney, Agent, or Firm*—James M. Spicer

[57] ABSTRACT

The rotor cage of a motor is extended, a second stator is coupled to this extended rotor cage, and the windings have the same number of poles. The motor torque and speed can be controlled by either injecting energy into or extracting energy out from the rotor cage. The motor produces less harmonics than existing doubly-fed motors. Consequently, a new type of low cost, high efficiency drive is produced.

20 Claims, 6 Drawing Sheets

Fig. 6A Partial Power Electronic Control

Fig. 6B Open Circuited

Fig. 6C Short Circuited

Fig. 6D Resistor Banks

EXTENDED CAGE ADJUSTABLE SPEED ELECTRIC MOTORS AND DRIVE PACKAGES

The United States Government has rights in this invention pursuant to contract no. DE-AC05-96OR22464 between the United States Department of Energy and Lockheed Martin Energy Research Corporation.

FIELD OF THE INVENTION

The present invention relates to the field of electric motor drive packages, and more specifically to electric motors featuring extended cage rotors used in conjunction with two nonmagnetically coupled stator assemblies.

BACKGROUND OF THE INVENTION

Figure 1:
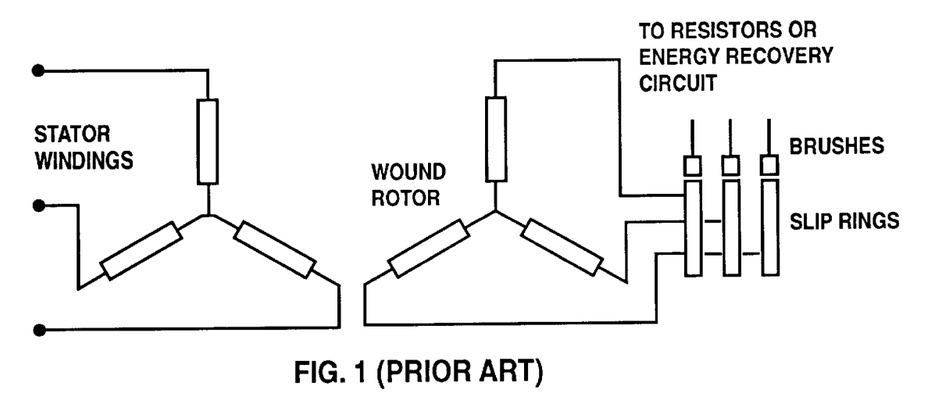
FIG. 1 (prior art) shows the essential components of the classical wound-rotor induction motor with slip rings.
Figure 2:
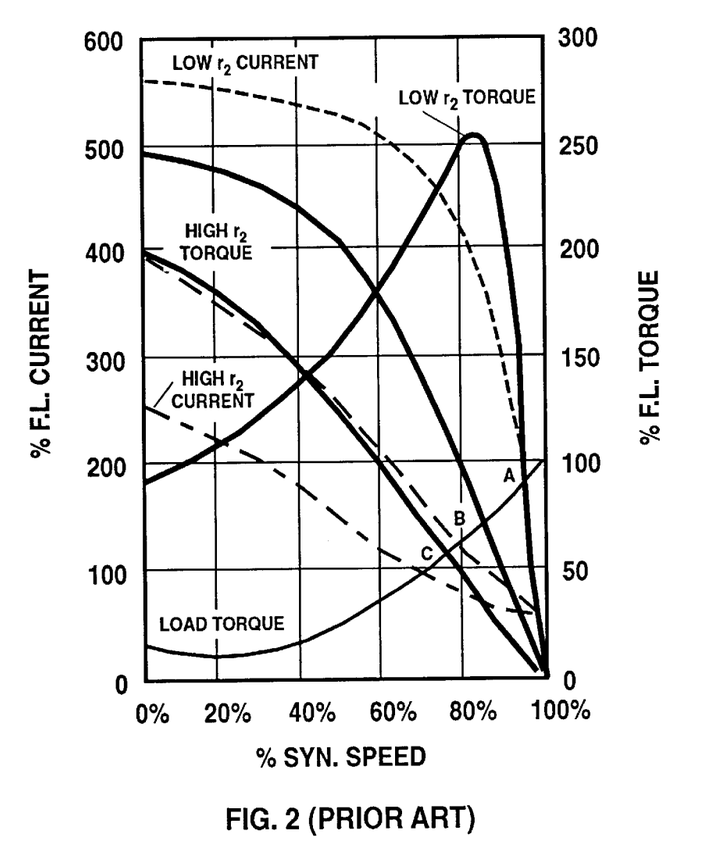
FIG. 2 (prior art) shows the motor torque, current, and load torque versus speed curves at different rotor resistance $r_2$ for the wound-rotor induction motor of FIG. 1.

FIG. 1 illustrates the essential components of the classical wound-rotor induction motor with slip rings known in the prior art. FIG. 2, also prior art, shows the motor torque, current, and load torque versus speed curves at different rotor resistance $r_2$ for the wound-rotor induction motor of FIG. 1. A typical fan-type load torque curve intersects the motor torque curves for different rotor resistances at points A, B, and C. The speed and the current are lower for higher rotor resistance $r_2$.

Figure 3:
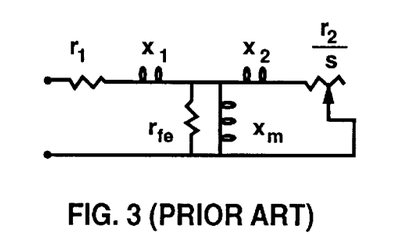
FIG. 3 (prior art) shows the equivalent circuit of the motor of FIG. 1.

FIG. 3, also prior art, shows the equivalent circuit of the motor of FIG. 1. It is similar to the equivalent circuit of a transformer. In fact, an induction motor can be viewed as a transformer. The stator winding is the primary winding and the rotor cage is the secondary winding of a transformer. In FIG. 3, although the stator and rotor are separated by an air gap, the rotor resistance $r_2$ and the rotor leakage reactance $x_2$ can be viewed as electrically connected to the circuit that comprises the stator resistance $r_1$, stator leakage reactance $x_1$, magnetization reactance $x_m$, and the core loss resistance $r_{fe}$. This is because the rotor and stator assembly are magnetically coupled to each other through the air gap. The symbol s is the motor slip. It represents the relative difference between the motor synchronous speed and the actual motor shaft speed. The motor mechanical output can be obtained by computing the energy associated with the equivalent rotor resistance $r_2$ over the slip s minus the rotor copper loss.

Over the years, adjustable speed electric motor drive packages have been achieved in various ways in different motor and control designs, including that shown in FIG. 1. (The electric motor drive package is combination of the motor and its control system.) In FIG. 1, for example, it is known to tap the rotor currents with brushes and route the rotor currents through an external resistor bank or energy conversion circuit. Variable resistor banks and energy conversion circuits allow smooth speed changes with the motor of FIG. 1.

Other adjustable speed electric motor drive packages, however, are characterized by abrupt speed changes. Examples include multiple speed winding motors such as the 2:1 ratio dual winding motor, and pole-amplitude-modulated (PAM) motors that give a synchronous speed ratio other than 2:1.

Adjustable frequency electric motor drive packages have also been developed. They tend to be expensive because they require fully-rated power electronic converters and inverters.

A drawback of most of the above electric motor drive packages is that when a power electronic control circuit is used, it has to be fully power-rated. By this is meant the power electronics needs to be capable of handling at least the full motor output power rating. Full power rating in the electronics drives up the cost of adjustable-speed electric motor drive packages, making them very expensive. The motor control system costs as much as three times that of the motor itself.

A recent development which lowers the cost of an adjustable-speed electric motor drive package is the brushless doubly-fed induction motor (BDFIM). One example, described by Liao (1996), has two sets of stator windings of 2p-pole and 2q-pole. The rotor winding has a 2(p+q)-pole nested cage. It produces less power output for a given frame as compared with the power output of a conventional motor. The BDFIM significantly lowers the electric motor drive package cost because only a portion of the motor output power has to be fed through its power electronic control circuit. That is, unlike many other adjustable-speed electric motor drive packages that require fully rated power electronics inverters and converters, the BDFIM requires only a partially rated power electronics inverter and converter.

However, since the BDFIM uses two different numbers of poles for its windings, it generates more harmonics than motors using a single number of poles. It would be desirable to eliminate these harmonics because all harmonics produce energy losses.

Thus, while the BDFIM makes possible an adjustable speed electric motor drive package of lower cost than other adjustable speed electric motor drive packages that have fully-rated power electronics inverters and converters, it produces unwanted energy-wasting harmonics. The utilization of motor active material (laminations, windings, etc.) is also less effective for motors with 2-p and 2-q poles than for a motor with windings of a single number of poles.

In contrast to the prior art, the present invention is a low-cost electric motor drive package based on a new motor design that produces no unwanted harmonics, is not a conventional BDFIM, yet can be used with a partially-rated power electronics control system resulting in a lower system cost.

SUMMARY OF THE INVENTION

It is a principal object of this invention to provide a low-cost, high-efficiency, adjustable-speed electric motor and drive package.

Another object of this invention is to provide an electric motor and control means that allows the major power to go to the motor directly without having to be routed through a power electronic circuit, resulting in an adjustable-speed electric motor drive package of lower cost.

Another object of this invention is to provide an electric motor drive package with full material utilization by means of a motor with windings of a single number of poles and a partially-rated power electronics inverter and converter.

Another object of the invention is to provide an electric motor drive package having reduced motor startup current.

Another object of the invention is to provide low cost electric motor drive packages wherein the motors have different numbers of phases, e.g., single-phase, 3-phase, etc.

Another object of the invention is to provide an extended cage motor that can be built with multiple synchronous speed windings such as the 2:1 ratio winding, or with a pole-amplitude-modulated (PAM) winding for widening the adjustable speed range and reducing the required power electronics cost.

Another object of the invention is to provide an electric motor that can be operated without a power electronic control circuit, the speed and current of the motor under load conditions being changed by opening the 2nd stator winding.

Another object of the invention is to provide an electric motor that can be operated without a power electronic control circuit, the speed and current of the motor under load conditions being changed by short-circuiting the 2nd stator winding.

Another object of the invention is to provide an electric motor that can be operated without a power electronic control circuit, the speed and current of the motor under load conditions being changed by connecting variable resistance to the stator winding.

Another object of the invention is to provide an adjustable speed motor without brushes or slip rings.

In accordance with a first preferred embodiment of the present invention, there is provided an adjustable speed electric motor drive package comprising a motor having an extended cage and two stator windings, the stator windings magnetically coupled to the extended cage but not to each other; and a control system for controlling the motor speed, startup current and running current.

In accordance with a second preferred embodiment of the present invention, there is provided an electric motor improvement comprising a first stator assembly; a second stator assembly not magnetically coupled to the first stator assembly; and an extended cage rotor having first and second rotor sections arranged along extended cage bars, the first rotor section magnetically coupled to the first stator assembly, and the second rotor section magnetically coupled to the second stator assembly.

In accordance with a third preferred embodiment of the present invention, there is provided an electric motor improvement comprising: a first stator assembly; a second stator assembly not magnetically coupled to the first stator assembly; and an extended cage rotor having first and second rotor sections, the rotor comprised of at least one short-circuited multiple-phase-wound winding, the first rotor section magnetically coupled to the first stator assembly, and the second rotor section magnetically coupled to the second stator assembly.

DETAILED DESCRIPTION OF THE INVENTION

The present invention is an extended cage adjustable speed motor and drive package. Like the BDFIM of the prior art, it is also doubly-fed; but unlike the BDFIM, it does not mix numbers of poles. Subsequently, it has low harmonic content for less loss and higher efficiency. It utilizes motor active material better, and retains the full power output capability of a given motor frame. The invention has many control options that can further lower the cost for adjustable speed drives. For example, like the BDFIM motors, but under a different operation principle of not mixing numbers of poles, my motor can use a partially-rated power electronic control circuit. But, in addition, my invention has several control options that are not feasible for the BDFIM motors. These include open-circuiting of the 2nd stator winding, short-circuiting of the 2nd stator winding, and connecting resistors to the 2nd stator winding.

Figure 5:
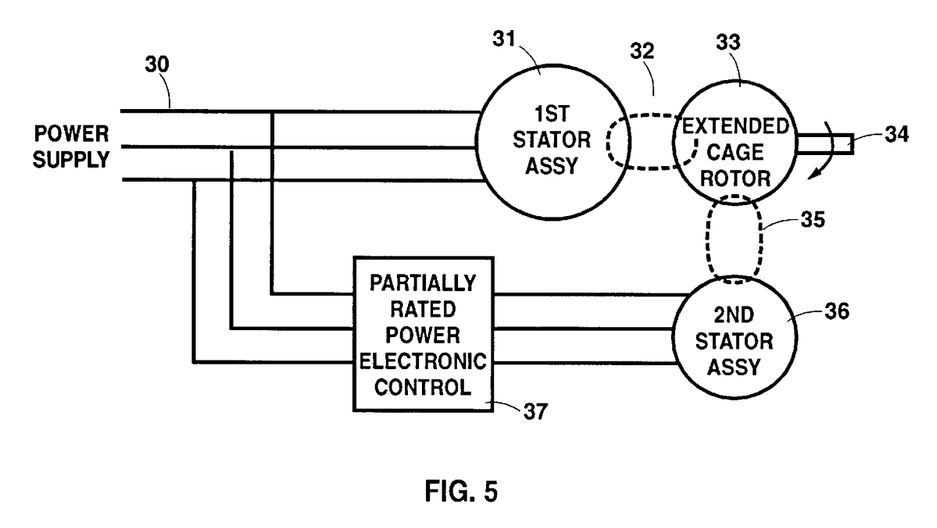
FIG. 5 is an electrical diagram of the invention.
Figure 6A:
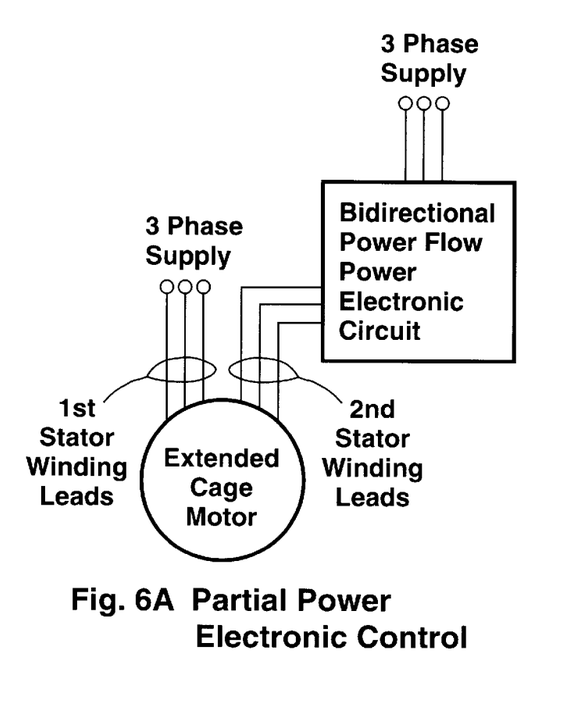
FIGS. 6A–6D illustrate various speed and current control options for the embodiments of the present invention using as a example a three-phase extended cage motor.
Figure 6B:
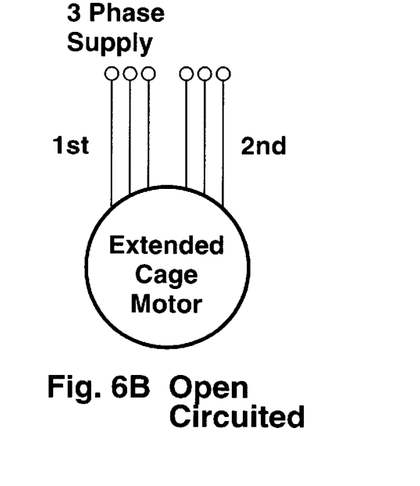
Figure 6C:
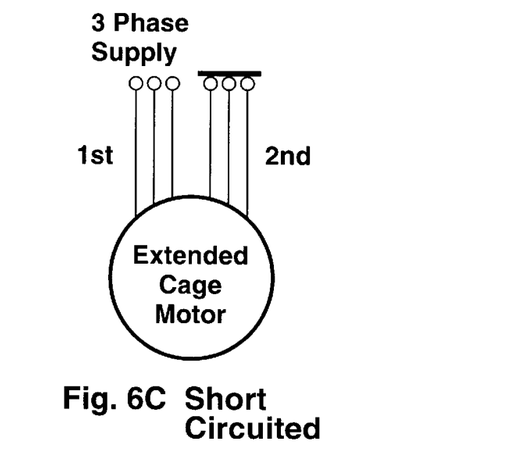
Figure 6D:
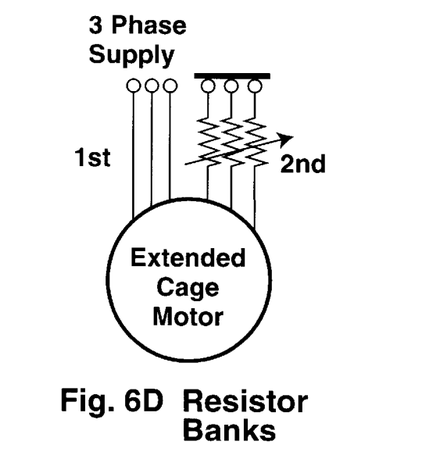

Further differences in my invention are that the rotor cage is extended, and two stator assemblies instead of one are provided, both separately coupled to the extended rotor cage, with the windings of the two stator assemblies having the same number of poles. My invention provides for extremely easy control the motor torque and speed by either injecting energy into or extracting energy from the rotor cage. Again, less harmonics are produced by this technology than the existing doubly-fed motors. Subsequently, I have achieved a new type of low cost, high efficiency electric motor drive package described as follows:

FIG. 5 shows the electrical diagram of the invention. The power supply is connected through leads 30 to the first stator assembly 31, and to the partially-rated power electronic control circuit 37. The power electronic control circuit 37 is connected to the second stator assembly. The power electronic control circuit 37 can be a conventional bidirectional power flow control circuit that allows the energy flowing from the power supply to the second stator winding or vice versa. There is no direct magnetic coupling between the first and the second stator assemblies. However, there is a close magnetic coupling indicated by the magnetic flux line 32 between the first stator assembly 31 and the extended cage rotor 33. The magnetic flux line 35, indicates that the second stator assembly 36 is closely coupled to the extended cage rotor 33 at a section that is not magnetically coupled to the first stator assembly. The rotor shaft 34 delivers the torque of the motor.

The mechanical energy coming out from the shaft 34, i.e., the output of the motor, comes from both the first and the second stator assemblies. Only a small portion of the energy is going through the power electronic control. The rating of the roughly three-times more expensive power electronic control can therefore be cut down to achieve the lower cost objective.

Because of the two separated stator and rotor magnetic couplings, the motor can be viewed as two separated induction motors that are electrically and mechanically tied together with an extended cage rotor. In transformer terms, the cage acts as the secondary winding of the transformer, and is extended and coupled with another stator winding. The equivalent circuit of this new motor can be derived from our understanding of the equivalent circuit of the conventional induction motor of FIG. 3.

Figure 4:
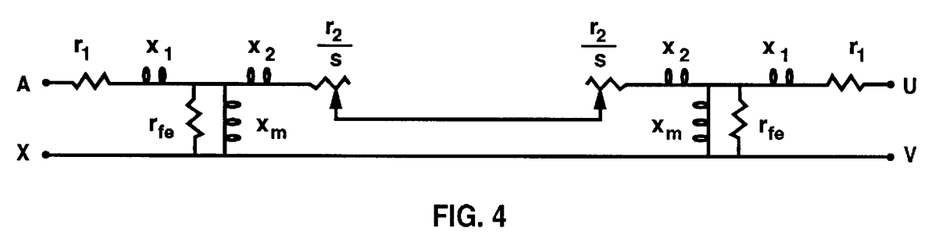
FIG. 4 shows the equivalent circuit of the extended cage motors of the present invention.

FIG. 4 shows the equivalent circuit of the extended cage motors of my invention. The left hand half represents the first stator assembly and its magnetically coupled section of the extended cage rotor. The terminals A and X are connected to a phase of the power supply. The right hand half represents the second stator assembly and its magnetically coupled section of the extended cage rotor. The terminals U and V are connected to a phase of the partially-rated power electronic control or to the various options explained later. The extended cage bars electrically connect the two rotor sections with respect to both the first and the second stator assemblies. The first subscript of parameters shown in the equivalent circuit of FIG. 4 is defined as those given in FIG. 3. The second subscript of the parameters is referring to either the first or the second stator assembly. For instance, $x_{12}$ represents the stator leakage reactance of the second stator assembly.

From the equivalent circuit of FIG. 4, one can see that the rotor current going through $r_{21}/s$ and $r_{22}/s$ can be changed by either connecting terminals U and V to the variable output of the power electronic control, by opening circuit of U and V without connecting to any power electronic control, by short circuiting terminals U and V without power electronic control, or by connecting U and V to appropriate resistors without power electronic control. The mechanical output of the motor shaft can be obtained by computing the energy associated with $r_{21}/s$ and $r_{22}/s$ minus the rotor copper loss. Subsequently, when the output of the motor shaft changes, the speed changes as per FIG. 2. The equivalent circuit clearly shows that the startup and running current corresponding respectively to when slip equals one and slip equals operating slip, can be changed under the different options described above. For example, the current going through terminals A and X is very small when terminals U and V are open circuited.

FIG. 6 shows the options of speed and current controls for all the embodiments of my invention using a three-phase extended cage motor as the example. In FIG. 6, the power supply is connected to the windings of the first stator assembly (not shown). The windings of the second stator assembly (not shown) can be connected to a bidirectional power-flow power electronic circuit, open-circuited, short circuited, or connected to resistor banks as illustrated in respective FIGS. 6A, 6B, 6C, and 6D. The extended cage motor can be constructed in three options.

FIRST PREFERRED EMBODIMENT

Figure 7:
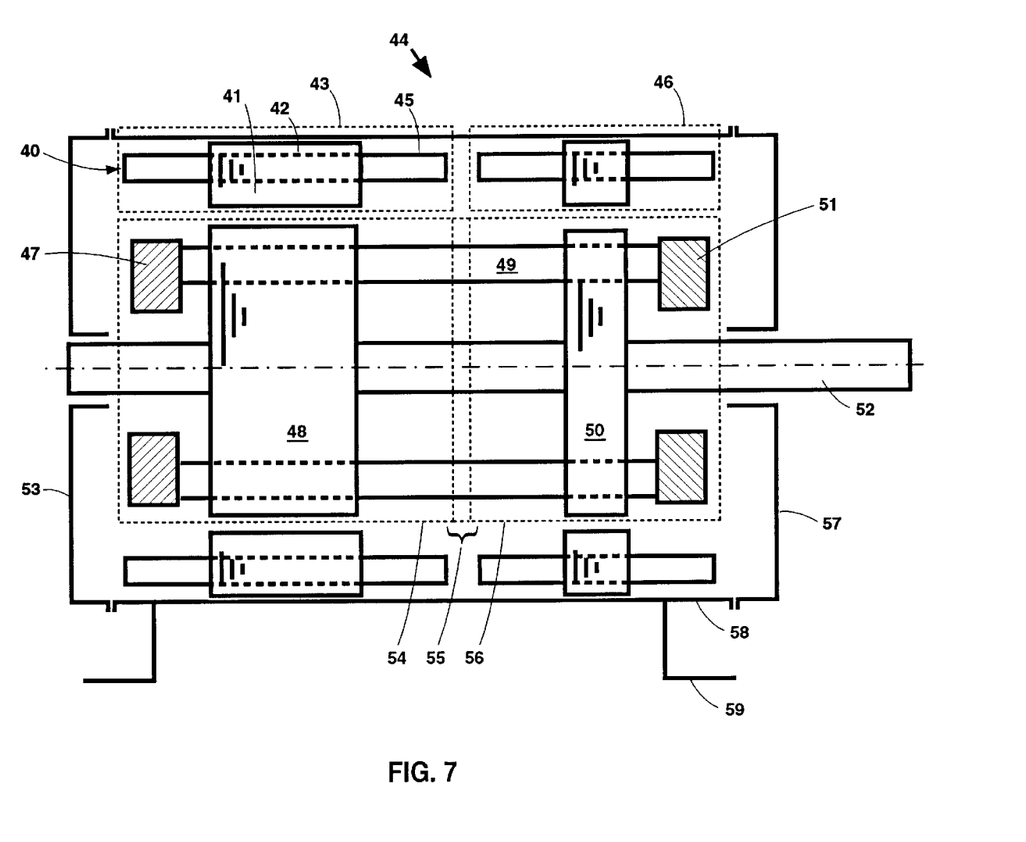
FIG. 7 is a cross-sectional view of a radial gap extended cage motor in accordance with one embodiment of the present invention.

FIG. 7 shows that a radial gap extended cage motor 44 can be constructed by having both the first stator assembly 43 and the second stator assembly 46 mounted in a frame 58. In FIG. 7, the first and second stator assemblies 43, 46 are illustrated as conventional drum-wound windings and lamination stacks, and have nonequal core lengths, i.e., are asymmetrical.

The manner in which this and the other motor embodiments of my invention are wound (FIGS. 7, 8, 9) follows conventional practice. The winding can be of any number of phases, typically single phase or three phase design, multiple speed windings such as the known 2:1 ratio dual speed winding, and the pole-amplitude modulation (PAM) windings.

The front end bracket 57 and the rear end bracket 53 are also mounted to the frame. The rotor shaft 52 rides on the bearings (not shown) in the end brackets. The first rotor lamination stack 48 and the corresponding asymmetrical second rotor lamination stack 50 are mounted on the shaft. Rotor bars 49 start from a rotor end ring 47, go through the slots in the first rotor lamination stack 48, continue as extended cage bars (still 49), go through the slots in the second rotor lamination stack 50, and finally connect to the other rotor end ring 51. The first stator winding 40, that comprises a slot portion 42 and an end-turn portion 45, is located in the first stator lamination stack 41. There is a close magnetic coupling between the first stator winding 40 and the rotor bars 49 of the first rotor section 54 by means of the magnetic flux going through the first stator lamination stack 41, the first rotor lamination stack 48, and the gap between them. There is no direct magnetic coupling between the first stator assembly 43 and the second stator assembly 46. The second stator assembly 46 is electrically related to the first stator assembly 43 through the rotor current that goes through the extended cage bars 49 (from the first rotor section 54 to the second rotor section 56 of the extended cage rotor 55. The term radial gap indicates that the gap between stator and rotor is in radial direction. The operation principle is explained earlier by means of the equivalent circuit in FIG. 4.

It is understood in the art that a rotor cage can be substituted by a set of short-circuited multiple phase windings. Accordingly, in all the embodiments of my invention, short-circuited multiple phase windings (not shown) could replace the cage bars 49, 72, and 101 in FIGS. 7, 8, and 9, respectively. The tightly packed windings would provide the physical strength and electrical conductivity of the cage bars 49, 72, and 101.

For motors having lower number of poles, such as two-pole motors, the stator end turns occupy substantial axial length. The long rotor cage extensions may hurt the motor performance and could require a long motor frame. The axial gap arrangement shown in FIG. 8 overcomes this problem.

SECOND PREFERRED EMBODIMENT

Figure 8:
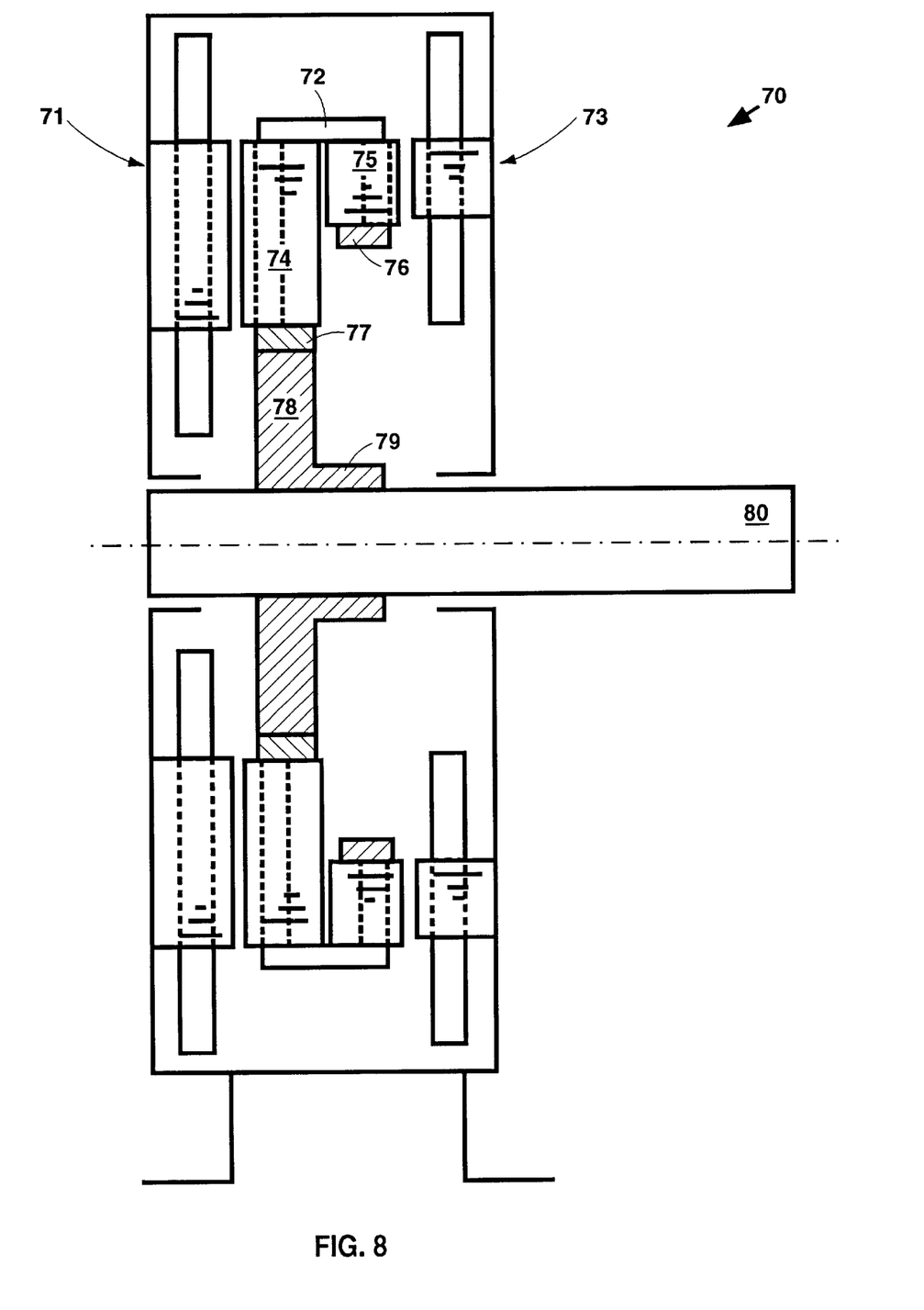
FIG. 8 is a cross-sectional view of an axial gap extended cage motor in accordance with another embodiment of the present invention.

FIG. 8 shows an axial gap arrangement of the extended cage motor 70. The first stator assembly 71 and the asymmetrical second 2 stator assembly 73 are part of the stator. The rotor comprises a shaft 80 and a rotor hub 79 that secures the first rotor lamination stack 74 and the corresponding asymmetrical second rotor lamination stack 75. Rotor end rings 76 and 77 are mounted on the rotor hub 79 in the following manner. The first rotor end ring 77 is affixed directly to the rotor hub 79. The rotor cage bars 72 start from the first rotor end ring 77, go through slots in the first rotor lamination stack 74, continue as j-shaped extended cage bars (still 72), go through the slots in the second lamination stack 75, and are finally connected to the second rotor end ring 76. The advantage L of this structure is that the length of the extended cage bars 72 is not affected by the length of the end turn portion of the stator windings. This can be attractive for 2-pole motors whose end turn portion is normally long.

THIRD PREFERRED EMBODIMENT

Figure 9:
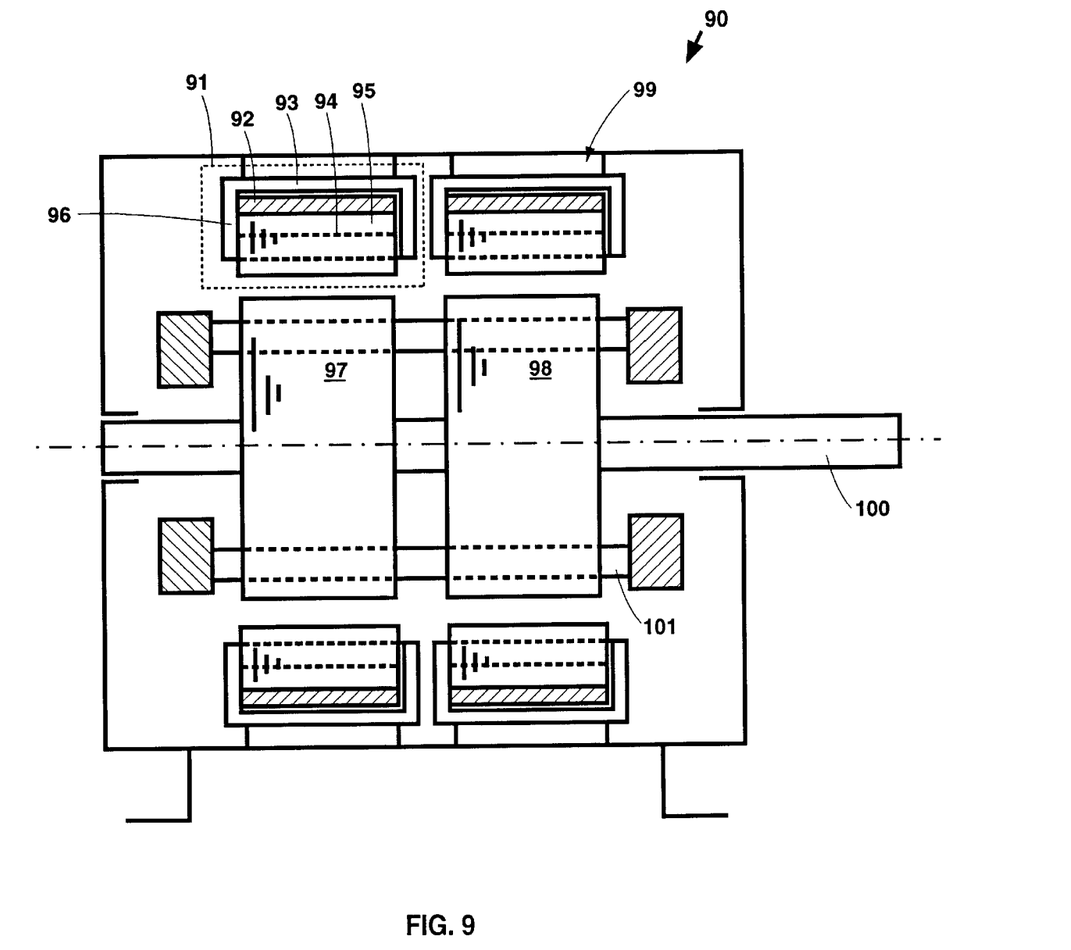
FIG. 9 is a cross-sectional view of a radial gap extended cage motor featuring toroidal stator windings in accordance with a third embodiment of the present invention.

FIG. 9 shows that the long end-turn portion problem for certain motors can also be overcome by using a toroidal stator winding. This is exemplified in the radial gap extended cage motor 90. The new feature allows the axial/radial length of radial gap/axial gap long end-turn motors to be shortened. The rotor in FIG. 9 comprising the first rotor lamination stack 97, the asymmetrical second rotor lamination stack 98, the rotor cage 101, and the rotor shaft 100 is similar to the rotor shown in FIG. 7. The length of the extended cage bars 101 can be shortened because the axial lengths of the stator end turn portions, such as 96, can be quite short. The first toroidal stator assembly 91 comprises the first stator lamination stack 95, the magnetic flux leakage shield 92 made of non magnetic metal for reducing the leakage reactance, and the toroidal winding 93, 94, 96 that wraps around the lamination stack 95 and the magnetic flux leakage shield 92. The toroidal winding of the first toroidal stator assembly 91 comprises a slot portion 94, end turn portion 96, and a return portion 93 to form a complete wrapping. The correspondingly asymmetrical second toroidal stator assembly 99 is similar to the first toroidal stator assembly 91. The same operation principle explained for FIG. 4 applies to this motor 90.

While there has been shown and described what is at present considered the preferred embodiments of the invention, it will be obvious to those skilled in the art that various changes and modifications may be made therein without departing from the scope of the invention as defined by the appended claims.

I claim:

1. In an electric motor, an improvement comprising:

a first stator assembly;

a second stator assembly asymmetrical to and not magnetically coupled to said first stator assembly; and an extended cage rotor having correspondingly asymmetrical first and second rotor sections arranged along nontransposed extended cage bars, said first rotor section magnetically coupled to said first stator assembly, and said second rotor section magnetically coupled to said second stator assembly; either or both of said first or second stator assemblies including a stator lamination stack, a toroidal winding disposed around said stator lamination stack, and a magnetic flux leakage shield made of nonmagnetic metal disposed between said stator lamination stack and said toroidal winding.

2. The motor of claim 1 further including a control system for controlling the motor speed, startup current and running current.

3. The motor of claim 2 wherein said control system comprises a power electronic control circuit to provide smooth speed control and bidirectional power flow.

4. The motor of claim 2 wherein said control system comprises arranging one of said stator windings in open circuit configuration.

5. The motor of claim 2 wherein said control system comprises connecting one of said stator windings in short circuit configuration.

6. The motor of claim 2 wherein said control system comprises connecting one of said stator windings to a bank of resistors.

7. The motor of claim 1 wherein said motor is a radial gap motor.

8. The motor of claim 1 wherein said motor is an axial gap motor.

9. The motor of claim 8 wherein said motor is a three-phase motor.

10. The motor of claim 8 wherein said motor is a single-phase motor.

11. The motor of claim 8 wherein said motor is a multiple speed winding motor.

12. In an axial gap extended cage electric motor including a rotor, two rotor end rings, and a rotor hub, an improvement comprising:

a first stator assembly;

a second stator assembly asymmetrical to and not magnetically coupled to said first stator assembly; and an extended cage rotor having correspondingly asymmetrical first and second rotor sections arranged along nontransposed j-shaped extended cage bars, said first rotor section magnetically coupled to said first stator assembly, said second rotor section magnetically coupled to said second stator assembly, said extended cage bars affixed between the two rotor end rings such that one of said end rings is affixed to said rotor hub.

13. The motor of claim 12 wherein said motor is a three-phase motor.

14. The motor of claim 12 wherein said motor is a single-phase motor.

15. The motor of claim 12 wherein said motor is a multiple speed winding motor.

16. The motor of claim 12 further including a control system for controlling the motor speed, startup current and running current.

17. The motor of claim 16 wherein said control system comprises a power electronic control circuit to provide smooth speed control and bidirectional power flow.

18. The motor of claim 16 wherein said control system comprises arranging one of said stator windings in open circuit configuration.

19. The motor of claim 16 wherein said control system comprises connecting one of said stator windings in short circuit configuration.

20. The motor of claim 16 wherein said control system comprises connecting one of said stator windings to a bank of resistors.

* * * * *